(12) United States Patent
Zhou et al.

(10) Patent No.: US 11,649,395 B2
(45) Date of Patent: May 16, 2023

(54) NONIONIC SURFACTANTS EMPLOYED WITH EXTENDED CHAIN AS THE OIL DISPLACEMENT AGENT TO USE IN ENHANCED OIL RECOVERY

(71) Applicants: CNPC USA CORPORATION, Houston, TX (US); Beijing Huamei, Inc., Beijing (CN)

(72) Inventors: Nancy Chun Zhou, Sugar Land, TX (US); Fuchen Liu, Panjin (CN)

(73) Assignees: CNPC USA CORPORATION, Houston, TX (US); BEIJING HUAMEI, INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 0 days.

(21) Appl. No.: 16/903,777

(22) Filed: Jun. 17, 2020

(65) Prior Publication Data

US 2021/0292636 A1     Sep. 23, 2021

Related U.S. Application Data

(60) Provisional application No. 62/992,725, filed on Mar. 20, 2020.

(51) Int. Cl.
| | |
|---|---|
| *C09K 8/584* | (2006.01) |
| *E21B 43/20* | (2006.01) |
| *C09K 8/588* | (2006.01) |
| *C09K 23/14* | (2022.01) |
| *C09K 8/594* | (2006.01) |

(52) U.S. Cl.
CPC .............. *C09K 8/584* (2013.01); *C09K 8/588* (2013.01); *C09K 8/594* (2013.01); *C09K 23/14* (2022.01); *E21B 43/20* (2013.01)

(58) Field of Classification Search
CPC ........ C09K 8/584; C09K 8/588; C09K 8/594; C09K 23/14; E21B 43/20
See application file for complete search history.

(56) References Cited

U.S. PATENT DOCUMENTS

| | | | |
|---|---|---|---|
| 4,194,565 A | | 3/1980 | Kalfoglou |
| 5,233,087 A | | 8/1993 | Cripe |
| 5,500,138 A | | 3/1996 | Bacon et al. |
| 5,545,350 A | | 8/1996 | Baker et al. |
| 6,828,281 B1 | * | 12/2004 | Hou ...................... C09K 8/584 |
| | | | 516/58 |
| 7,842,650 B2 | * | 11/2010 | Steinbrenner ........... E21B 21/14 |
| | | | 507/102 |
| 9,296,942 B2 | | 3/2016 | Weerasooriya et al. |
| 10,370,584 B2 | | 8/2019 | Velez et al. |
| 2011/0263467 A1 | * | 10/2011 | Bittner ..................... C09K 8/86 |
| | | | 507/254 |
| 2011/0281779 A1 | * | 11/2011 | Weerasooriya .... C08G 65/2609 |
| | | | 562/110 |
| 2012/0125643 A1 | * | 5/2012 | Langlotz ................ C09K 8/588 |
| | | | 166/400 |
| 2021/0002444 A1 | * | 1/2021 | Dwarakanath ........... C09K 8/94 |

FOREIGN PATENT DOCUMENTS

| | | | | |
|---|---|---|---|---|
| CA | 2746366 A1 | * | 6/2010 | .......... B01F 17/0042 |
| CN | 101921584 A | * | 12/2010 | |
| WO | WO-2014193720 A1 | * | 12/2014 | ............. C09K 8/584 |
| WO | WO-2015135777 A2 | * | 9/2015 | ............... C09K 8/38 |

OTHER PUBLICATIONS

Yan et al., Performances of Guerbet Alcohol Ethoxylates for Surfactant-Polymer Flooding Free of Alkali, 2017, Energy & Fuels, 31, 9319-9327 (Year: 2017).*
Translation of CN 101921584 A (Year: 2010).*

* cited by examiner

*Primary Examiner* — Angela M DiTrani Leff
(74) *Attorney, Agent, or Firm* — Hogan Lovells US LLP

(57) ABSTRACT

Some reservoirs have tight oil formations, such as the Changqing reservoir. The surfactant polymer flooding and low tension gas flooding are two potential chemical flooding methods for use in tight oil formations. In these methods, an oil displacement agent, or surfactant, is added. Nonionic surfactants with extended chains (by propylene oxide and ethylene oxide) from dialkyl alcohols or dialkyl amines were tested. A synergistic blend of surfactants was developed between the nonionic surfactants and anionic surfactants that lowers interfacial tension and improves surfactant solubility in water and oil.

8 Claims, 3 Drawing Sheets

NONIONIC SURFACTANTS EMPLOYED WITH EXTENDED CHAIN AS THE OIL DISPLACEMENT AGENT TO USE IN ENHANCED OIL RECOVERY

CROSS-REFERENCE TO RELATED APPLICATIONS

The current application claims the benefit of U.S. Provisional Appl. Ser. No. 62/992,725, filed Mar. 20, 2020, which is herein incorporated by reference in its entirety.

FIELD

The disclosure relates generally to oil recovery. The disclosure relates specifically to surfactants used in oil recovery.

BACKGROUND

Enhanced oil recovery is the process of increasing the amount of oil that can be recovered from a reservoir. The Changqing reservoirs in China have tight oil formations. Tight oil is oil trapped in rock formations such shale, limestone, or tight sandstone. These rock formations have lower permeability than other reservoirs. Often, hydraulic fracturing is utilized to create adequate permeability in order to access the oil economically.

It would be advantageous to have an oil displacement agent to use in enhanced oil recovery. Moreover, it would be advantageous to have a surfactant to act as an oil displacement agent to improve oil recovery for the Changqing tight oil reservoir.

SUMMARY

An embodiment of the disclosure is a nonionic long chain surfactant of formula $C_{n+1}H_{2n+3}CH(C_{n+3}H_{2n+7})CH_2O(PO)_x(EO)_yH$ wherein: n may be 3, 5, 7, 9, 11, or 13; x can be from 5-50; and y can be from 5-30. In an embodiment, x can be from 5-40, 5-30, 5-20, or 5-10. In an embodiment, y can be from 5-20 or 5-10. In an embodiment, the surfactant is dissolved in formation water with at least one anionic surfactant. In an embodiment, the at least one anionic surfactant is alkyl benzene sulfonate. In an embodiment, the weight ratio of the nonionic long chain surfactant to the anionic surfactant is from 2:5 to 6:1. In an embodiment, the weight ration can be 3:4, 4:3, or 5:2.

An embodiment of the disclosure is a nonionic long chain surfactant of formula $(R)_2N(PO)_x(EO)_yH$ wherein: R is a coco or tallow fatty alkyl chain; x can be from 5-50; and y can be from 5-30. In an embodiment, x can be from 5-40, 5-30, 5-20, or 5-10. In an embodiment, y can be from 5-20 or 5-10. In an embodiment, the surfactant is dissolved in formation water. In an embodiment, the nonionic long chain surfactant further comprises a 0-20% salt solution. In an embodiment, the salt is monovalent or divalent. In an embodiment, the salt is selected from the group comprising: NaCl, KCl, $MgCl_2$, $MgCO_3$, $CaCl_2$, and combinations thereof. In an embodiment, the surfactant is also dissolved in 0-5% polymer. In an embodiment, the polymer is polyacrylamide.

An embodiment of the disclosure is a method of preparing a nonionic long chain surfactant comprising adding KOH to an alcohol in a reactor to form a mixture; heating the mixture in the reactor to about 100° C. with agitation under vacuum with a nitrogen purge for about 0-2 hours; heating the mixture to about 120° C.-150° C.; adding propylene oxide slowly; incubating the reaction for about 2-6 hours; adding ethylene oxide slowly; incubating the reaction for about 2-6 hours at a temperature of 100° C.-150° C.; cooling the reaction mixture to about 60° C.; and unloading the nonionic long chain surfactant. In an embodiment, the nitrogen purge is for 1-2 hours. In an embodiment, the mixture is heated at 120° C.-140° C., 130° C.-150° C., or 130° C.-140° C. In an embodiment, the reaction is incubated for 2-4 hours. In an embodiment, the reaction is incubated at a temperature of 100° C.-130° C., 100° C.-120° C., 110° C.-140° C., 130° C.-140° C., 120° C.-140° C., 130° C.-150° C., or 130° C.-140° C.

An embodiment of the disclosure is a method of enhancing oil recovery using the nonionic long chain surfactant comprising dissolving the nonionic long chain surfactant in formation water to form a mixture with at least one anionic surfactant; and flooding the reservoir with the mixture. In an embodiment, the mixture further comprises a 0-20% salt solution. In an embodiment, the salt is monovalent or divalent. In an embodiment, the salt is selected from the group comprising: NaCl, KCl, $MgCl_2$, $MgCO_3$, $CaCl_2$, and combinations thereof. In an embodiment, the mixture further comprises a 0-5% polymer or 40-90% foam quality gases with 0-1% foamer. In an embodiment, the mixture further comprises 40-70%, 50-80%, or 60-70% foam quality gases. In an embodiment, the mixture further comprises 0-0.5%, 0.5-1%, or 0.2-0.8% foamer. In an embodiment, the polymer is polyacrylamide. In an embodiment, the foamer is cocoamidopropyl betaine. In an embodiment, the foam quality gases are at least one selected from the group consisting of nitrogen, de-oxygenated air, and natural gas.

The foregoing has been outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
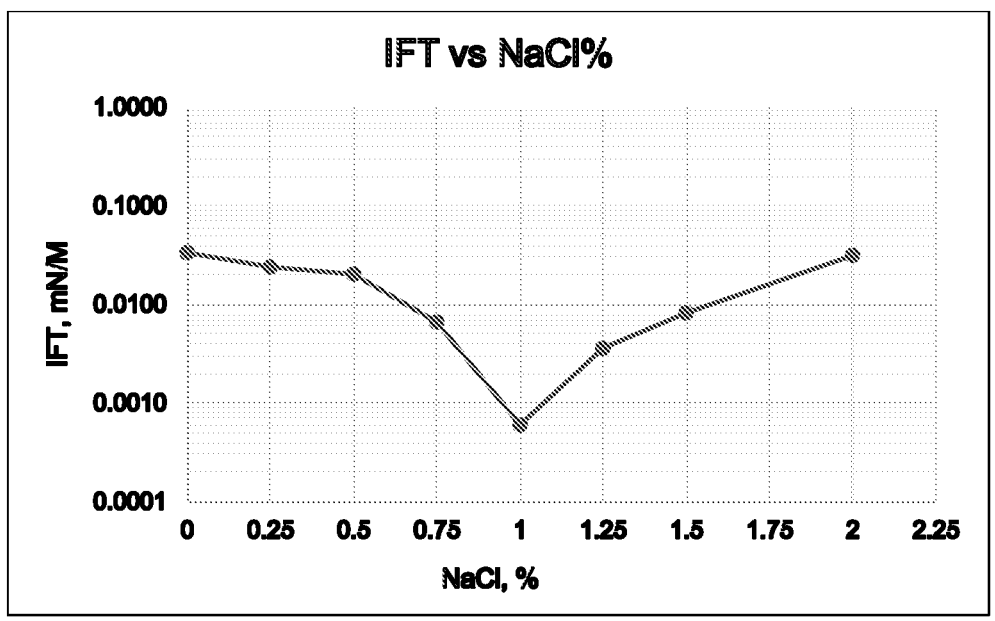
FIG. 1 depicts a graph of interfacial tension (IFT) vs NaCl %.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Surfactant-polymer (SP) flooding and low tension gas (LTG) flooding are proposed as two chemical flooding methods for enhanced oil recovery from the Changqing reservoir. In both methods, the key additive is the oil displacement agent or surfactant. Initially, a series alkyl propoxy sulfates (APS) (primary surfactant) with alkyl benzyl sulfonates (ABS) (co-surfactant) were tested. Following those tests, nonionic surfactants with extended chains (by propylene oxide) (PO) and ethylene oxide (EO)) from dialkyl alcohols and/or dialkyl amines were tested.

A synergistic blend of surfactants was developed between the nonionic surfactants and an anionic surfactant that lowers interfacial tension (IFT) and improves surfactant solubility in water and oil.

In an embodiment, the functional groups of branched dialkyl alcohols and amines, an extended polymeric chain comprising propylene oxide and ethylene oxide, and a nonionic surfactant tail to adjust the hydrophilic-lipophilic balance, are combined to improve oil solubilization, lower surface tension, and change the wettability of reservoir rocks.

NZ48-63 is a reaction product of a dialkyl primary alcohol (e.g., Guerbet alcohol) with an extended chain of polymerization products from propylene oxide (5-50) and ethylene oxide (5-30). It functions as a wetting agent and has synergistic properties with alkyl benzyl sulfonates. It lowers the interfacial tension (IFT) to less than $10^{-3}$ mN/m and demonstrates good phase behavior with Type I, Type III, and Type II in a salinity scan.

Products, including but not limited to NZ48-63, can be used in surfactant related flooding, such as surfactant polymer flooding and low tension gas flooding. In various embodiments, the surfactants can be dissolved in the formation water or in the formation water with 0-20% of salt. The salts can be monovalent, such as NaCl, KCl, and the like, or divalent, such as $MgCl_2$, $MgCO_3$, $CaCl_2$, and the like. In an embodiment, the surfactants can also be dissolved in the formation water with 0-20% of salt and 0-5% polymer, such as Flopaam 3230S (polyacrylamide) produced by SNF. In an embodiment, the surfactants can also be dissolved in the formation water with 0-15%, 0-10%, 0-5%, 0-2.25%, 5-20%, 5-15%, 5-10%, 10-20%, or 10-15% of salt. In an embodiment, the surfactants can also be dissolved in the formation water with 0-0.25%, 0-0.5%, 0-1%, 0-4%, 2-5%, or 1-3% of polymer. In an embodiment, the former solution can be used in low tension gas flooding with a gas such as nitrogen. In an embodiment, the latter solution can be used in surfactant polymer flooding.

EXAMPLES

Example 1

Synthesis of Alcohol Derivative

A nonionic surfactant from a di-alkyl alcohol was synthesized as follows: 230 g (0.65 mol) of Guerbet alcohol C24 (Sasol Isofol C24, CAS 58670-89-6) were added to a 1000 mL Parr reactor. KOH pellets as the catalyst (0.39 g) were added in the reactor with an agitation blade, a temperature probe, a cooling for temperature control. The mixture was heated in the reactor to 100° C. with agitation and subjected to a vacuum (<20 torr) with a small nitrogen purge. The N2 purge was stopped after 1 hr. The mixture was then heated to 120-130° C. Propylene oxide was added slowly. After 566 g of PO was added, PO addition was stopped, and the reaction was continued for 4 more hours until the PO amount is less than 2000 ppm. The reaction mixture was cooled to 60° C. and the intermediate product 359 g was sampled out. An additional 207 g PO was added into the remaining 436 g of the intermediate. Then, 157 g ethylene oxide (EO) was added slowly (by shot, keep pressure less than 30 psi). The reaction was continued for another 4 more hours until the EO amount was less than 1000 ppm. The reaction mixture was cooled to 60° C. and the product unloaded. The product was named NZ48-63.

Example 2

Synthesis of Amine Derivative

A nonionic surfactant from a di-alkyl amine was synthesized as follows. The synthesis utilizes a similar lab procedure to Example 1, but with 2C and 2HT amines as the starting materials.

Example 3

Surfactant Formulation Development and Phase Behavior Tests

Several experiments show that the synthesis surfactant with ABS has good performance in lowering the interfacial tension (IFT), as shown in FIG. 1.

Figure 2:
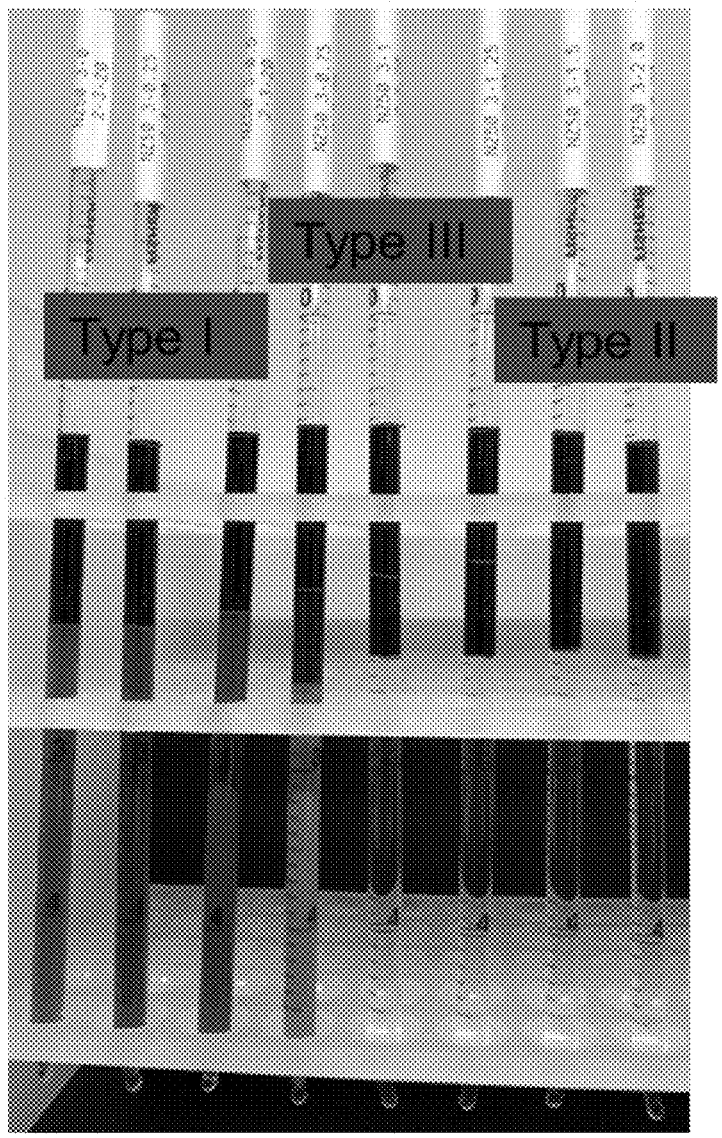
FIG. 2 depicts a photograph of pipets containing types I, II, and III microemulsions following phase behavior tests; the first three pipets are Type I microemulsions, the middle three pipettes are Type III microemulsions, and the last two pipettes are the Type II microemulsions.

Phase behavior tests show formation of Type I, II, and III microemulsions, as shown in FIG. 2. In FIG. 2, the first three pipets are Type I microemulsions, the middle three pipettes are Type III microemulsions, and the last two pipettes are the Type II microemulsions.

Example 4

LTG Core Flooding Test

Figure 3:
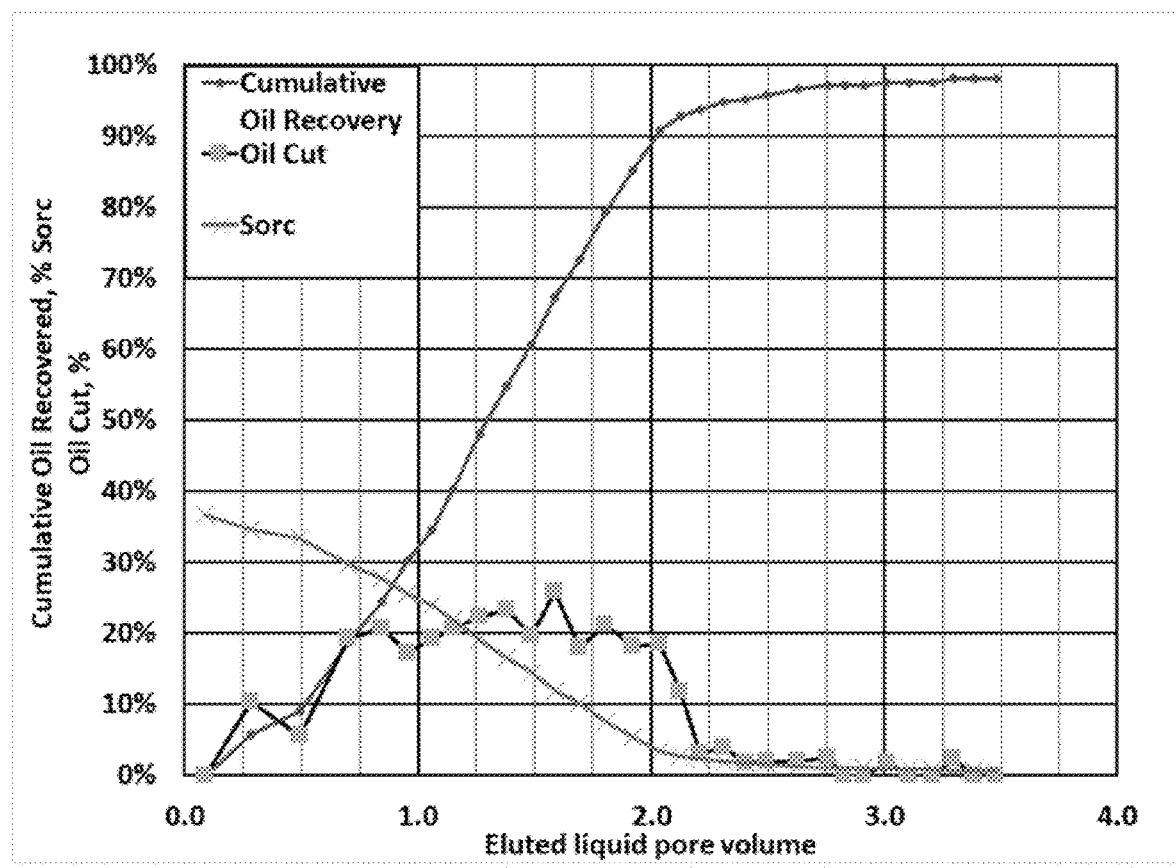
FIG. 3 depicts a graph of oil recovery versus eluted liquid pore volume.

The low tension gas (LTG) core flood was performed in a reservoir composite core with 30 mD permeability from a tight oil field in China. About 0.5 PV of surfactant slug was co-injected with 0.5 PV of gas (assuming 1100 psi and 43° C.) for 1.0 PV total at 50% foam quality. The LTG core flooding was performed using 0.5 wt. % NZ48-63 (Oxirane, Methyl-, Polymer with Oxirane, Mono(2-decyltetradecyl) Ether with CAS#72484-69-6), 0.4 wt. % ABS and 0.1 wt. % foamer (Cocamidopropyl betaine, 61789-40-0). FIG. 3 depicts the oil recovery data. The LTG core flood recovered 98% of the oil residual. NZ48-63 was also tested at different concentrations, such as 0.4 wt. % and 0.3 wt. %. ABS was also tested at 0.3 wt. % and 0.2 wt. % concentrations. Foamer was also tested with a concentration of 0.2 wt. %. Reasonable performance results for phase behavior tests were obtained, indicating a good potential oil displacement effect in a field application.

Example 5

SP Flooding

The surfactant polymer flooding (SP) was performed with a formula package of 0.6 wt. % NZ48-63 (Oxirane, Methyl-, Polymer with Oxirane, Mono(2-decyltetradecyl) Ether with CAS #72484-69-6); 0.4 wt. % ABS and 0.5 wt. % cosolvent Ph-4EO (phenol, Ethoxylated, with CAS #9004-78-8). Experiments with both 50% and 25% of the above concentrations were explored and yielded reasonable performance. With lower concentration, a smaller solubilization ratio predicts a lower oil recovery.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of enhancing oil recovery comprising:
    dissolving a nonionic long chain surfactant in formation water to form a mixture with at least one anionic surfactant, wherein the anionic surfactant is alkyl benzene sulfonate; and
    flooding the reservoir with the mixture,
    wherein the nonionic long chain surfactant is of the formula $C_{n+1}H_{2n+3}CH(C_{n+3}H_{2n+7})CH_2O(PO)_x(EO)_yH$
    wherein:
        n is 3, 5, 7, 9, 11 or 13;
        x is from 5-50; and
        y is from 5-30;
        wherein the interfacial tension of the nonionic long chain surfactant when combined with the alkyl benzyl sulfonate is between $10^{-3}$ mN/m and $10^{-4}$ mN/m.

2. The method of claim 1 wherein the mixture further comprises a 0-20% salt solution.

3. The method of claim 2 wherein a salt in the salt solution is monovalent or divalent.

4. The method of claim 3 wherein a salt in the salt solution is selected from the group comprising: NaCl, KCl, $MgCl_2$, $MgCO_3$, $CaCl_2$), and combinations thereof.

5. The method of claim 1 wherein the mixture further comprises 0-5% of a polymer or 40-90% foam quality gases with 0-1% foamer.

6. The method of claim 5 wherein the polymer, when present, is polyacrylamide.

7. The method of claim 5 wherein the foamer, when present, is cocoamidopropyl betaine.

8. The method of claim 5 wherein the foam quality gases are at least one selected from the group consisting of nitrogen, de-oxygenated air, and natural gas.

* * * * *